US011889210B2

(12) United States Patent
Chossat et al.

(10) Patent No.: US 11,889,210 B2
(45) Date of Patent: Jan. 30, 2024

(54) IMAGE SENSORS

(71) Applicant: STMicroelectronics (Grenoble 2) SAS, Grenoble (FR)

(72) Inventors: Jerome Chossat, Voiron (FR); Mathieu Thivin, Voreppe (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 17/575,070

(22) Filed: Jan. 13, 2022

(65) Prior Publication Data

US 2022/0247946 A1 Aug. 4, 2022

(30) Foreign Application Priority Data

Jan. 29, 2021 (FR) ...................................... 2100897

(51) Int. Cl.
*H04N 25/68* (2023.01)
*H04N 25/772* (2023.01)
*H04N 25/702* (2023.01)
*H04N 25/76* (2023.01)
*H04N 25/683* (2023.01)

(52) U.S. Cl.
CPC ........... *H04N 25/68* (2023.01); *H04N 25/772* (2023.01)

(58) Field of Classification Search
CPC .... H04N 25/68; H04N 25/772; H04N 25/702; H04N 25/76; H04N 25/683
See application file for complete search history.

(56) References Cited

U.S. PATENT DOCUMENTS

| 6,118,482 | A  | * | 9/2000  | Clark ..................... | H04N 25/68 348/308 |
| 7,466,161 | B2 | * | 12/2008 | Gardner ................ | G06F 1/1309 324/760.01 |
| 7,667,751 | B2 | * | 2/2010  | Fraenkel ................ | H04N 23/70 348/294 |
| 8,531,566 | B2 | * | 9/2013  | Cieslinski ............ | H04N 17/002 348/308 |
| 9,843,797 | B2 | * | 12/2017 | Myers .................... | H04N 25/68 |

(Continued)

FOREIGN PATENT DOCUMENTS

WO     2020121699 A1     6/2020

OTHER PUBLICATIONS

INPI Search Report and Written Opinion for priority application, FR 2100897, report dated Oct. 4, 2021 (8 pages).

(Continued)

*Primary Examiner* — Marly S Camargo
(74) *Attorney, Agent, or Firm* — Crowe & Dunlevy

(57) ABSTRACT

An electronic device includes a first array of image pixels having inputs coupled to first selection tracks and outputs coupled to first output tracks, a second array of test pixels having inputs coupled to second selection tracks and outputs coupled to the first output tracks, and a third array of test pixels having inputs coupled to the first selection tracks and outputs coupled to second output tracks. A processor is coupled to receive output signals on the first and second output tracks. The output signals from the test pixels of the second and third arrays are fixed at one or the other of only two values in the absence of a defect. The output signals received by the processor over the first and second output tracks are processed to determine presence or absence of a defect.

24 Claims, 4 Drawing Sheets

(56) References Cited

U.S. PATENT DOCUMENTS

| | | | |
|---|---|---|---|
| 10,623,728 B2* | 4/2020 | Chua | H04N 17/002 |
| 11,336,852 B2* | 5/2022 | Guo | H04N 25/772 |
| 2007/0091187 A1* | 4/2007 | Lin | H04N 25/683 |
| | | | 382/275 |
| 2011/0242375 A1 | 10/2011 | Cieslinski | |
| 2016/0295205 A1* | 10/2016 | Lim | H04N 17/002 |
| 2020/0014914 A1* | 1/2020 | Chua | H01L 27/14643 |
| 2020/0204794 A1 | 6/2020 | Chua et al. | |
| 2021/0409680 A1* | 12/2021 | Oka | H04N 25/68 |

OTHER PUBLICATIONS

First Office Action for counterpart EP Appl. No. 22151208.0, report dated Jun. 30, 2023, 4 pgs.

* cited by examiner

IMAGE SENSORS

PRIORITY CLAIM

This application claims the priority benefit of French Application for Patent No. 2100897, filed on Jan. 29, 2021, the content of which is hereby incorporated by reference in its entirety to the maximum extent allowable by law.

TECHNICAL BACKGROUND

The present disclosure generally concerns image sensors, in particular CMOS image sensors.

BACKGROUND

Conventionally, an image sensor comprises pixels arranged in an array of rows and columns. For each row, the pixels in the row are coupled to a plurality of row conductive tracks which enable selection and control of all the pixels in the row. For each column, the pixels in the column are coupled to a conductive track of the column which enables collection of a signal representative of the light intensity captured by the pixel of the column which is selected. The column tracks of the sensor are connected to an output stage of the sensor, particularly carrying out functions of sampling, amplification, analog-to-digital conversion, and storage of the levels of signals read from the column tracks. Generally, the pixels of a same row are simultaneously read from (in parallel) by the sensor output stage, and the pixels of different rows are successively read from.

For certain applications, as a non-limiting example, in the field of CMOS image sensors embarked in motor vehicles, it may be desirable to perform an integrity checking of the sensor elements before, after, and/or during each acquisition of an image by the sensor.

SUMMARY

An embodiment overcomes all or part of the disadvantages of known image sensors.

An embodiment provides an electronic device comprises: a first array of image pixels having inputs coupled to first selection tracks and outputs coupled to first output tracks; at least one second array of test pixels having inputs coupled to second selection tracks and outputs coupled to the first output tracks; at least one second array of test pixels having inputs coupled to the first selection tracks and outputs coupled to second output tracks; and a processor, wherein each test pixel of the second and third arrays is configured to supply the processor with an output signal at one or the other of two values in the absence of a defect with at least one of the first selection tracks or one of the first output tracks, and wherein the processor is configured to determine presence of the defect in response to delivery by one or a plurality of the test pixels of the output signal at another value than one or the other of the two values.

According to an embodiment, each image pixel comprises at least one photodiode and is configured to generate an output voltage at its output which depends on the light reaching said at least one photodiode, and each test pixel comprises an input receiving one or the other of two reference voltages so that the test pixel delivers the output signal at one or the other of the two values in the absence of the defect.

According to an embodiment, the electronic device comprises a circuit for controlling the first and second selection tracks, an analog processing and analog-to-digital conversion circuit coupled to the first and second output tracks, and a support having the first, second, and third arrays, the control circuit, and the analog processing and analog-to-digital conversion circuit arranged thereon, the second array being located on the support on the side of the first array opposite to the analog processing and analog-to-digital conversion circuit and the third array being located on the support on the side of the first array opposite to the control circuit.

According to an embodiment, the image pixels of the first array are configured to deliver video signals on acquisition of an image. The second array and/or the third array comprises at least one assembly of test pixels configured to deliver output signals, each at one or the other of two values in the absence of a defect. The processor is configured to successively receive a succession of the output signals of the at least one assembly of test pixels read with video signals of image pixels of the first array, to determine from the successive reading of any portion, comprising at least a given number of the successively-read output signals of the at least one assembly of test pixels, whether the orientation of the acquired image is correct, and/or to which position of the first array of image pixels correspond the video signals read with the output signals of said portion.

According to an embodiment, the given number of successively read output signals corresponds to the length of the smallest region of interest of the image on which the processor is configured to apply a processing.

According to an embodiment, the processor is configured to determine whether the orientation of the acquired image is correct, and/or to which position of the first array of image pixels correspond the video signals read with the output signals of said portion even if one of the output signals of said portion is not at one of said two values.

According to an embodiment, the processor is configured to determine, for each output signal, whether the output signal is at one or the other of the two values and, in the case where the output signal is not at one or the other of the two values, indicate that the image pixels, coupled to the same selection track and/or to the same first output track as the test pixel having delivered the output signal, are invalid.

According to an embodiment, the test pixels of the at least one assembly of test pixels are distributed into successive groups of test pixels, each group comprising a first set of test pixels, and a second set of test pixels, the test pixels of the first set of each group being configured to deliver the same output signals at one or the other of two values, and at least a portion of the test pixels of the second set of each group being configured to deliver output signals, at one or the other of two values, different from one group to the other.

According to an embodiment, the test pixels of each first set are configured to deliver a succession of output signals alternating between the first and second values.

According to an embodiment, the test pixels of the second set of each group are configured to deliver output signals coding a unique identifier of said group.

According to an embodiment, the test pixels of each second set are distributed into pairs of test pixels configured to deliver the same output signals.

According to an embodiment, each assembly of test pixels comprises a first row or column of test pixels adjacent to a second row or column of test pixels, the pixels of the first and second rows or columns of test pixels being paired, and the test pixels of each pair of test pixels being configured to deliver different output signals among the two values.

According to an embodiment, the processor is configured to determine, for each pair of test pixels, whether the output signals delivered by the test pixels in the pair are different and, in the case where the output signals are not different, indicate that the image pixels, coupled to the same selection track and/or to the same first output track as the test pixels in the pair, are invalid.

According to an embodiment, the image pixels of the first array are arranged in rows and in columns, the device being configured to operate in a first configuration where all the rows of the first array are successively selected and in a second configuration where only a portion of the rows of the first array are successively read, the number of test pixels of said at least one assembly of test pixels being smaller than the number of rows of said portion.

According to an embodiment, each test pixel comprises a first MOS transistor having a drain coupled to an input node, a source coupled to a second node, and a gate coupled to one of the selection tracks, a second MOS transistor having a drain coupled to a high reference voltage, a source coupled to the second node, and a gate coupled to a reset signal track, a first follower coupled to the second node and configured to replicate a voltage on the second node towards an output of the first follower, and a third transistor having a drain coupled to the output of the first follower, a source coupled to a read output, and a gate coupled to a readout signal track. Each image pixel comprises a photodiode, a fourth MOS transistor having a drain coupled to the anode or the cathode of the photodiode, a source coupled to a third node, and a gate coupled to one of the selection tracks, a fifth MOS transistor having a drain coupled to high reference voltage, a source coupled to the third node, and a gate coupled to a reset signal track, a second follower coupled to the third node and configured to replicate a voltage on the third node towards an output of the second follower, and a sixth transistor having a drain coupled to the output of the second follower, a source coupled to a read output, and a gate coupled to a readout signal track.

An embodiment also provides a method of designing the electronic device such as previously defined, comprising the determination of each test pixel delivering an output signal at one of the two values in the absence of a defect and each test pixel delivering an output signal at the other one of the two values in the absence of a defect, so that the test pixels of the second array and/or of the third array form at least one assembly of test pixels, to be able to determine, from the successive reading of any portion, comprising at least a given number of the successively-read output signals of the at least one assembly of test pixels, whether the orientation of the acquired image is correct, and/or to which position of the first array of image pixels correspond video signals read with the output signals of said portion.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties. For the sake of clarity, only the steps and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements. Unless specified otherwise, the expressions "around", "approximately", "substantially" and "in the order of" signify within 10%, and preferably within 5%. Further, a signal which alternates between a first constant state, for example, a low state, noted "0", and a second constant state, for example, a high state, noted "1", is called a "binary signal". The high and low states of different binary signals of a same electronic circuit may be different. In practice, the binary signals may correspond to voltages or to currents which may not be perfectly constant in the high or low state.

An embodiment of an image sensor will be described in an example of application where the image sensor forms part of an advanced driving assistance system that may be incorporated in an automobile. However, it should be clear that the present embodiment of the image sensor may be implemented as soon as there exists a need to implement a test of the proper operation of the image sensor.

Figure 1:
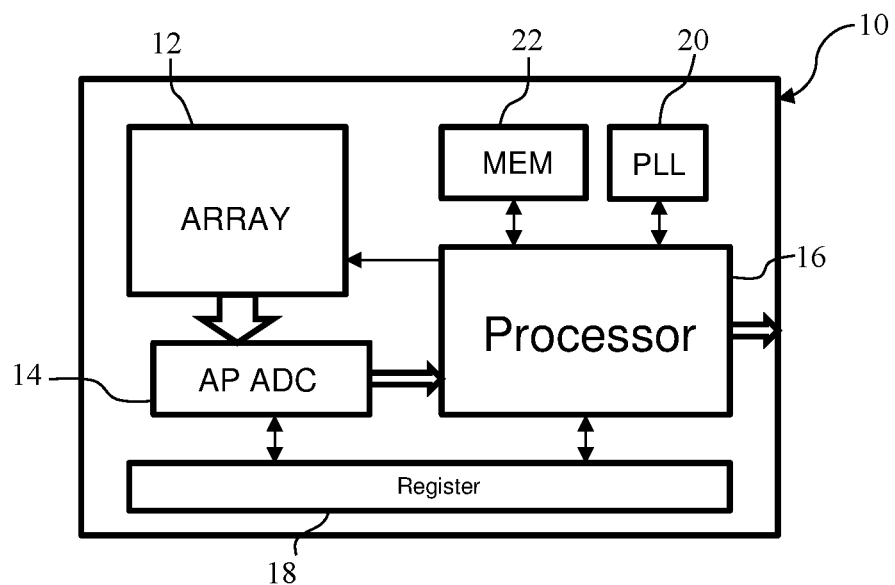
FIG. 1 shows an embodiment of an image sensor.

FIG. 1 partially and schematically shows an embodiment of an image sensor 10.

Image sensor 10 comprises an array 12 of pixels, not shown in FIG. 1, at least some of which capture image data in an analog format and deliver the image data, analogically, to an analog processing (AP) and analog-to-digital conversion (ADC) circuit 14, which filters the image data in the analog field and converts the image data to the digital field to generate digital image data. The analog processing and analog-to-digital conversion circuit 14 transmits the digital image data to a processor 16 which, in accordance with the settings received from control registers 18, executes the desired digital processing functions. As an example, processor 16 may carry out processing operations aiming at improving the image.

Processor 16 delivers output signals via an appropriate data interface, such as a parallel data interface or a serial data interface, either directly to other components of the vehicle with which sensor 10 is associated, or to such components via a data bus. A phase-locked loop (PLL) 20 delivers a clock signal to be used by processor 16, and a memory (Mem) 22 provides a non-volatile or volatile data storage for processor 16. As an example, when image sensor 10 forms part of an advanced driving assistance system, the images acquired by the image sensor may be transmitted to a processor capable of carrying out functions such as the determination of an imminent collision of the vehicle having image sensor 10 on board thereof.

Figure 2:
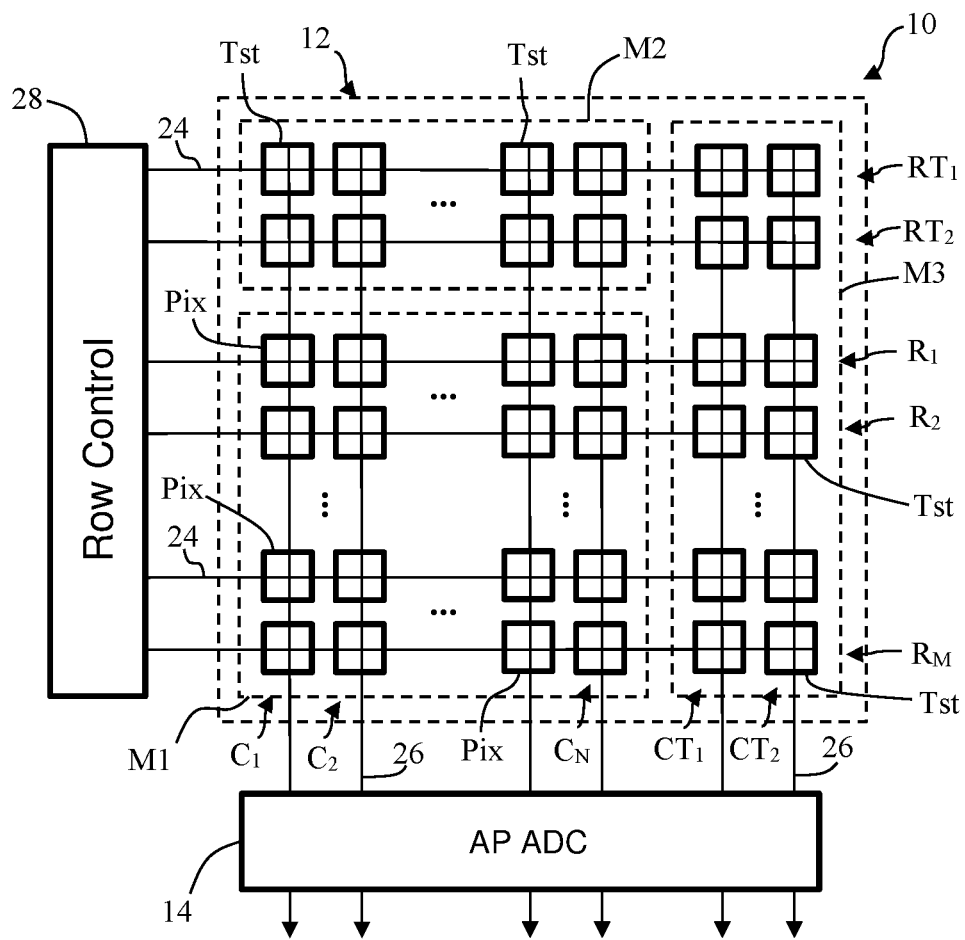
FIG. 2 shows a more detailed embodiment of a portion of the image sensor of FIG. 1.

FIG. 2 shows a more detailed embodiment of a portion of the image sensor 10 of FIG. 1. As shown in FIG. 2, pixel array 12 comprises:

a first array M1, or network, of pixels comprising image pixels Pix arranged in rows $R_i$ and columns $C_j$, M and N being natural integers, i a natural integer in the range from 1 to M, and j a natural integer in the range from 1 to N;

a second array M2, or network, of pixels comprising test pixels Tst arranged along a first edge of first array M1 in rows $RT_k$ and columns $C_j$, R being a natural integer greater than or equal to 2, k a natural integer in the range from 1 to R, and j a natural integer in the range from 1 to N, R being equal to 2 in FIG. 2;

a third array M3, or network, of pixels, comprising test pixels Tst arranged along a second edge of first array M1, contiguous to the first edge, and along an edge of the second array M2, in rows $R_i$ and $RT_k$ and columns $CT_p$, Q being an integer greater than or equal to 2, i an integer in the range from 1 to M, and p an integer in the range from 1 to Q, Q being equal to 2 in FIG. 2;

for each row $R_i$ and $RT_k$, a row conductive track 24, also called selection track, coupled, for each row $R_i$, to inputs of the image pixels Pix of the first array M1 of row $R_i$ and to inputs of the test pixels Tst of the third array M3 of row $R_i$, and coupled, for each row $RT_k$, to inputs of the test pixels Tst of the second array M2 of row $RT_k$ and to inputs of the test pixels Tst of the third array M3 of row $RT_k$; and for each column $C_j$ and $CT_p$, a conductive track 26 extending along column $C_j$ or $CT_p$, indifferently called column track or output track hereafter, coupled, for each column $C_j$, to outputs of the image pixels Pix of the first array M1 of column C and to outputs of the test pixels Tst of the second array M2 of column $C_j$, and coupled, for each column $CT_p$, to outputs of the test pixels Tst of the third array M3 of column $CT_p$.

According to an embodiment, M varies from 1 to a few tens of thousands, and N varies from 1 to a few tens of thousands. According to an embodiment, R is even and Q is even. According to an embodiment, R varies from 2 to a few tens, and Q varies from 2 to a few tens.

Image sensor 10 further comprises a row control circuit 28 configured to control selection tracks 24, for example configured to deliver a binary selection signal RD on each selection track 24. According to an embodiment, row control circuit 28 is connected to the selection tracks 24 of all rows $R_i$ and $RT_k$ on the side of the first array M1 opposite to the third array M3 of test pixels Tst. Analog processing and analog-to-digital conversion circuit (AP ADC) 14 is connected to the column tracks 26 of all columns $C_j$ and $CT_p$ on the side of the first array M1 opposite to the second array M2 of test pixels Tst.

Each image pixel Pix comprises a photosensitive element, for example, a photodiode, configured to capture the incident light radiation during a so-called integration phase, and to deliver an analog electric signal representative of the light intensity captured during the integration phase. The output signal delivered by each image pixel Pix may vary between first and second limiting values, one of them being representative of the reception of a minimum, or even zero, light intensity during the integration phase, and the other being representative of the reception of a maximum light intensity during the integration phase.

According to an embodiment, the test pixels Tst have the same electric structure, or substantially the same, as image pixels Pix, and share the same selection tracks 24 and/or the same column tracks 26 as first array M1, with a noted difference. This difference is that instead of the photosensitive element, each test pixel Tst comprises a node delivering a known voltage having one of two values. Since the voltages delivered by test pixels Tst are known, the execution of a given operation on the test pixels Tst should provide a known result. When the known result is not generated, it can be deduced therefrom that one or a plurality of the selection and output tracks 24 and 26 have not operated correctly or that the readout circuits such as processing and analog-to-digital conversion circuit 14 or row control circuit 28 have not operated correctly. Thus, it can be deduced therefrom that the output of the image pixels Pix of the first array M1 cannot be reliable, since the first array M1 shares exactly the same selection and output tracks 24 and 26 as the test pixels Tst and uses the same analog processing and analog-to-digital conversion circuit 14 and the same row control circuit 28. Thus, in the case where image sensor 10 forms part of an advanced driving assistance system, processor 16 may take an appropriate action based on this knowledge (for example, deactivation of an automatic drive mode, warning of a driver that the collision detection or the lane departure warnings are off-line, etc.).

According to another embodiment, test pixels Tst may take different forms and be electrically different from image pixels Pix. Generally, the structure of test pixels Tst is such that each test pixel Tst delivers an expected output signal when the electronic circuits of the readout chain operate correctly and does not deliver the expected output signal when the electronic circuits of the readout chain do not operate correctly.

According to an embodiment, each test pixel Tst is configured to deliver, during a read operation, an output signal at a first value or at a second value. As an example, the first value may be the same output signal as an image pixel Pix having received a minimum light intensity during an integration phase and the second value may be the same output signal as an image pixel having received a maximum light intensity during the integration phase. When test pixel Tst delivers the output signal at the second value, test pixel Tst is said to be at "0", and when test pixel Tst delivers the output signal at the first value, test pixel Tst is said to be at "1".

Figure 3:
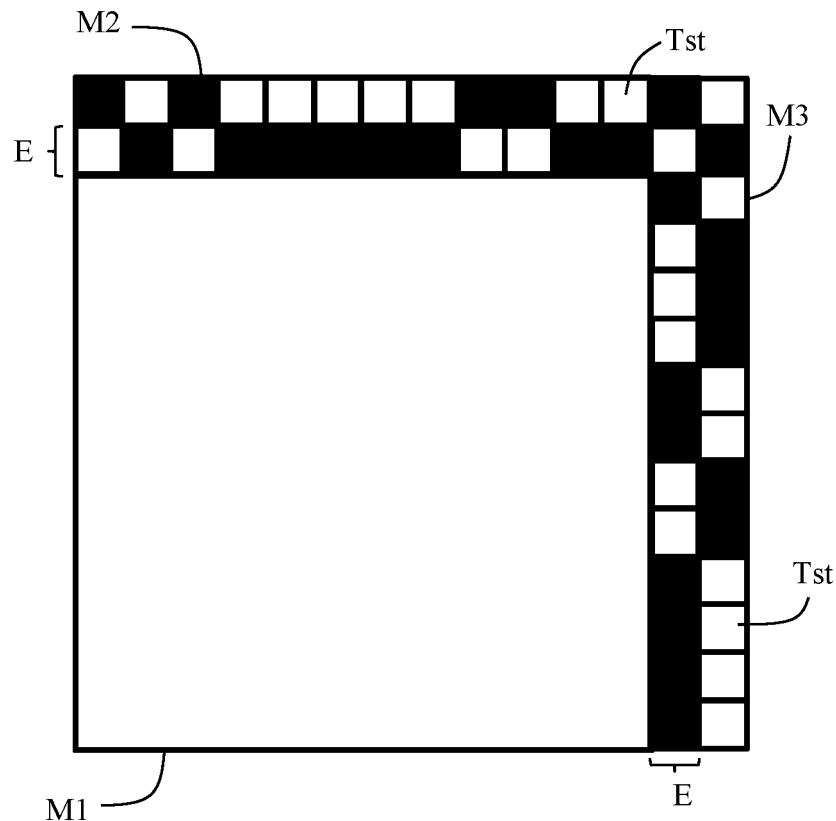
FIG. 3 illustrates an embodiment of distribution of values of the test pixels of the image sensor of FIG. 2.

FIG. 3 schematically shows an example of distribution of the values of test pixels Tst. As an example, in FIG. 3, a test pixel Tst at first value "1" has been represented by a white square and a test pixel Tst at second value "0" has been represented by a black square.

According to an embodiment, the distribution of the "0 s" and "1"s in the second and third arrays M2 and M3 of test pixels Tst is determined according to a set of rules. A rule is that, for second array M2, for at least one row $RT_k$, there is another row $RT_{k'}$, k' being different from k, such that, for each column $C_j$, with j varying from 1 to N, the values of the test pixels Tst of rows $RT_k$ and $RT_{k'}$ are opposite. When the second array M2 only comprises two rows $RT_1$ and $RT_2$, this means that, for each column $C_1$ to $C_N$, the values of the test pixels Tst of rows $RT_1$ and $RT_2$ are opposite. Another rule is that, for the third array M3 for at last one column $CT_p$, there is another column $CT_{p'}$, p' being different from p, such that, for each row $R_i$, with i varying from 1 to M, the values of the test pixels Tst of columns $CT_p$ and $CT_{p'}$ are opposite. When the third array M3 only comprises two columns $CT_1$ and $CT_2$, this means that, for each row $R_1$ to $R_M$, the values of the test pixels Tst of columns $CT_1$ and $CT_2$ are opposite. Further, call a pair of test pixels two test pixels Tst of rows $RT_k$ and $RT_{k'}$ of opposite values of the second array M2 and belonging to the same column $C_j$ or two test pixels of the columns $CT_p$ and $CT_{p'}$ of an assembly of test pixels of the third array M3 belonging to the same row $R_i$. In the following description, it is said that a pair of first and second test pixels is at "1" when the first test pixel is at "1" and the second test pixel is at "0" and that the pair of test pixels is at "0" when the first test pixel is at "0" and the second test pixel is at "1". According to an embodiment, a pair of test pixels may allow the coding of a bit. As an example, each pair of test pixels at "1" codes bit "1" and each pair of test pixels at "0" codes bit "0", or conversely.

In the following description, call an assembly E of test pixels one of the rows $RT_k$ and $RT_{k'}$ of the second array M2 verifying the previously-described rule or one of the columns $CT_p$ and $CT_{p'}$ of the third array M3 verifying the previously-defined rule. In FIG. 3, as an example, the second and third arrays M2 and M3 each comprise a single assembly E of test pixels.

Figure 4:
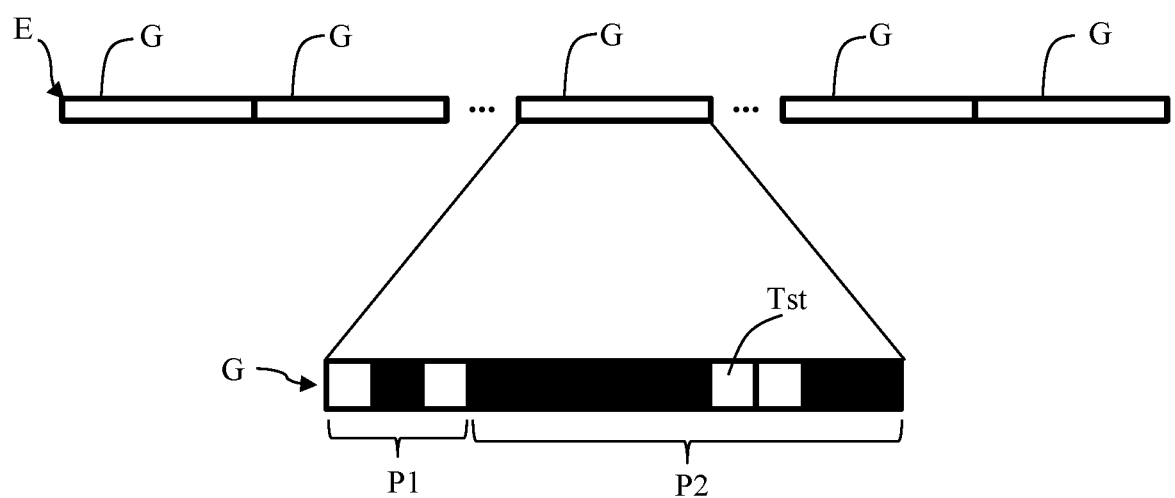
FIG. 4 illustrates an embodiment of distribution of values of the test pixels of the image sensor of FIG. 2.

FIG. 4 shows an example of distribution of the values "0" and "1" of the test pixels Tst of an assembly E of test pixels. Each assembly comprises a succession of groups G of test pixels Tst. Each group G comprises a number SIZE_G of test pixels. Number SIZE_G is preferably identical for all the groups G of the assembly. Number SIZE_G may depend on the number M of rows and/or on the number N of columns. Number SIZE_G may be the same whether the assembly belongs to the second array M2 or to the third array M3. According to an embodiment, number SIZE_G varies from 16 to 128. Generally, number SIZE_G is substantially equal to the minimum dimension of the image portion, also called region of interest, which is desired to be located. Number SIZE_G must, however, be sufficiently large to allow the coding of a single identifier for each group as described in further detail hereafter.

Each group G comprises a succession of at least a first pattern P1 and a second pattern P2, also called first set P1 and second set P2.

First pattern P1 comprises a number SIZE_P1 of successive test pixels Tst having alternated values, for example, successively a test pixel at "0", a test pixel at "1", a test pixel at "0", etc. According to an embodiment, number SIZE_P1 is even. According to an embodiment, number SIZE_P1 is greater than or equal to 4 and is, for example, equal to 4. The first pattern P1 is called synchronization code hereafter.

The second pattern P2 comprises a number SIZE_P2 of successive test pixels Tst and enables to code an identifier of the group G. Advantageously, the second pattern P2 cannot be mistaken with the first pattern P1. For this purpose, the second pattern P2 is not overlapping with the value of the first pattern P1 by any translation or an inversion. The identification of each group G of assembly E is unique. The second patterns P2 of two groups G of assembly E are thus different. According to an embodiment, the second pattern P2 enables to code a counter having its value increasing from the first group to the last group G of assembly E. The second pattern P2 is called group identifier hereafter. According to an embodiment, number SIZE_P2 is even. According to an embodiment, number SIZE_P2 varies from 12 to 124. The sum of numbers SIZE_P1 and SIZE_P2 is equal to SIZE_G.

According to an embodiment, in the second pattern P2, the values of the test pixels are duplicated. This means that the test pixels of second pattern P2 are arranged in pairs of test pixels of same values, preferably in pairs of successive test pixels of same values. According to an embodiment, number SIZE_P2 is even. According to an embodiment, the second pattern P2 allows the coding of the identifier of the group G with a number SIZE_P2/2 of test pixels.

According to an embodiment, when each test pixel codes a bit, the second pattern P2 may correspond to a (SIZE_P2)/2 bit counter. As an example, for the 36$^{th}$ group G of assembly E, number 36 being coded by binary code "00100100", in the case where SIZE_P2 is equal to 26, the second pattern P2 corresponds to binary code "00000000000000110000110000".

Figure 5:
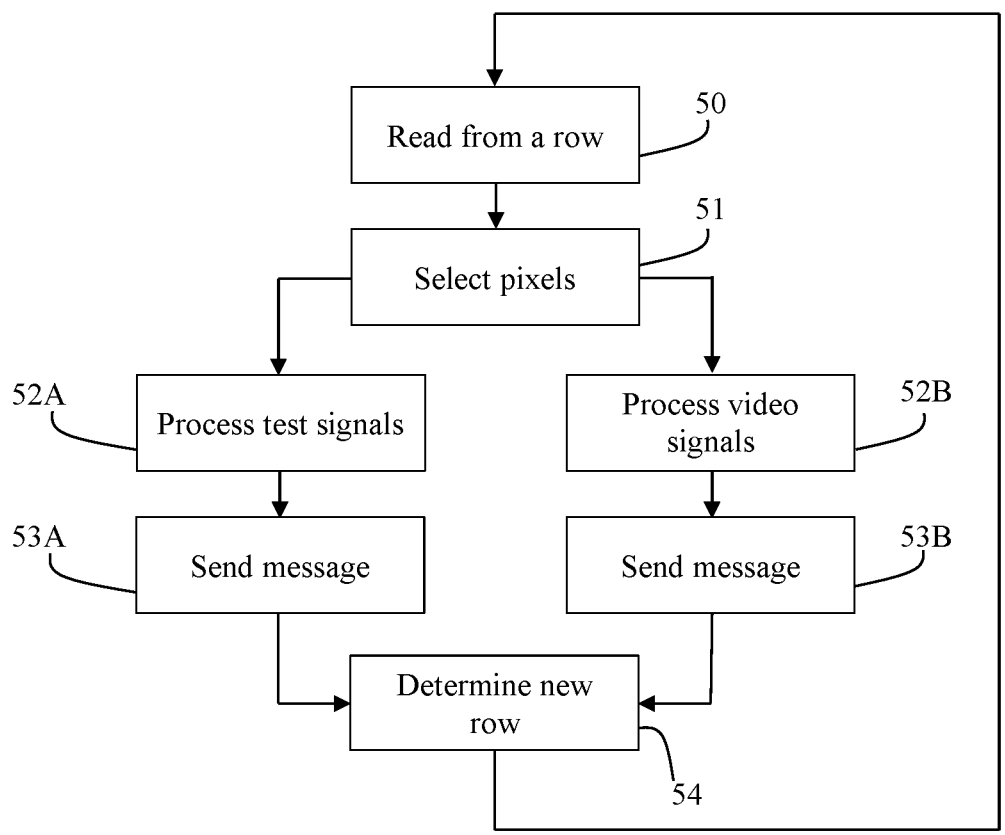
FIG. 5 illustrates, in a flow diagram, an embodiment of a method of acquisition of an image by the image sensor of FIG. 1.

FIG. 5 illustrates, in a flow diagram, an embodiment of a method of acquisition of an image by the image sensor 10 of FIGS. 1 to 4.

At step 50, a row of array 12 is selected and the output signals delivered by the pixels of the selected row are read by analog processing and analog-to-digital conversion circuit 14 and converted into digital signals transmitted to processor 16. Call test signal the digital signal originating from the analog-to-digital conversion of the output signal delivered by test pixels Tst and call video signal the digital signal originating from the analog-to-digital conversion of the output signal delivered by an image pixel Pix. The method carries on at step 51.

At step 51, processor 16 selects the test signals and the video signals from among the digital signals received at step 50. When a row of the second array M2 of test pixels Tst is selected, all the digital signals received by processor 16 are test signals, while, for the other rows of array 12, the digital signals received by processor 16 comprise test signals and video signals. The method carries on at step 52A for the processing of the test signals by processor 16 and at step 52B for the processing of the video signals by processor 16. Steps 52A and 52B may be carried out sequentially or in parallel by processor 16. According to an embodiment, processor 16 may determine whether the selected pixel row is a row of the second array M2 of test pixels Tst based on the rank of the selected row.

At step 52A, processor 16 performs a processing on the test signals received for the pairs of test pixels Tst associated with an assembly of the second array M2 of test pixels Tst obtained after the reading of the output signals for two rows of array 12 or for a pair of test pixels of the third array M3 of test pixels Tst obtained after the reading of the output signals for a row of array 12. Generally, the processing may be carried out after the complete acquisition of the image or along the acquisition of the successive rows of the image. The processing may comprise assigning the value "0" or "1" to the test signal. As an example, the test signal is set to "1" if it is greater than a first threshold and is set to "0" if it is smaller than a second threshold. The first and second thresholds may be stored in a memory or may be generated by processor 16. If the test signal is comprised between the first and second thresholds, the processor determines whether an error occurs. Since each test pixel is used to deliver an output signal at one or the other of two values, the method of assignment of values "0" and "1" is little sensitive to the noise present on the readout chain. An error may correspond to a problem on the actual test pixel or on the readout chain delivering the test signal. The values of the test pixels of each pair of test pixels have to be opposite. If processor 16 assigns the same value "0" or "1" to the two test pixels of the same test pair, this means that an error has occurred.

The processing may then comprise the decoding of the test signals. According to an embodiment, when each pair of test pixels enables to code a bit, the decoding operation may comprise the determination of the bits coded by the pairs of test pixels. Advantageously, for the first pattern P1 of each group G, if an error is obtained during the assignment of values "0" or "1" to the test signals of a pair of test pixels, the determination of the bit coded by this pair of test pixels remains possible based on the test signals of the other pairs of test pixels of the first pattern P1. Advantageously, for the second pattern P2 of each group G, if an error is obtained during the assignment of values "0" or "1" to the test signals, the determination of the bit coded by this pair of test pixels remains possible since couples of test pairs of same values are present. This enables to obtain a decoding method which is robust.

Based on the first pattern P1 of each group G, the processor may determine whether the acquired image is properly oriented, or whether an inversion between the top and the bottom and/or between the right-hand side and the left-hand side has occurred. As an example, if binary code "1010" is expected for a first pattern P1 of the second array M2 and processor 16 determines binary code "0101", this means that the image has its right-hand side and its left-hand side inverted. As an example, if binary code "1010" is expected for a first pattern P1 of the third array M3 and processor 16 determines binary code "0101", this means that the image has its top and bottom inverted.

Based on the second pattern P2 of each group G, processor 16 may determine to which position of array 12 the test signals correspond. As an example, based on the determination of the identifier of a group G of the second array M2, processor 16 may determine at which position of the image it is located along the columns, and based on the determination of the identifier of a group G of the third array M3, processor 16 may determine at which position in the image it is located along the rows.

According to an embodiment, in a first configuration, processor 16 may control the reading of an entire new image or, in a second configuration, may control the reading of a portion of a new image only. The second configuration may be advantageous, for example, when an area of interest is determined by processor 16 in a new acquired image, to refresh the area of interest at a higher frequency, or for example when the size of array M1 is greater than the size of the desired image, to be able to only select a sub-portion of the image to obtain the desired size. Further, when the image sensor is arranged in a vehicle, the position of this sub-portion may be dependent on the exact orientation of the sensor in the vehicle and may be determined for each vehicle in order to compensate for mechanical alignment errors. According to the first configuration, the reading of a new acquired image may comprise the successive reading of all the pixel rows of array 12, that is, by successively reading the rows $RT_1$ to $RT_R$ of the second and third arrays M2 and M3 and then the rows $R_1$ to $R_M$ of the first and third arrays M1 and M3. According to the second configuration, the reading of a portion of the acquired image may comprise the successive reading of all the rows $RT_1$ to $RT_R$ of the second and third arrays M2 and M3, followed by a jump to the first row of the first and third arrays M1 and M3 of the area of interest, and then the successive reading of the pixel rows of the first and third arrays M1 and M3 from the first row of the first and third arrays M1 and M3 of the area of interest all the way to the last row of pixels of the first and third arrays M1 and M3 of the area of interest. Further, for the second array M2, all the output signals of all columns $C_1$ to $C_N$ may be read, while, for the area of interest, only the output signals of the columns of the area of interest of the first array M1 may be read with the columns $CT_1$ to $CT_Q$ of the third array M3. Based on the second pattern P2 of each group G, processor 16 may determine whether the reading effectively bears on the area of interest of the image.

Advantageously, the size SIZE_G of each group is smaller than or equal to half the minimum size of the area of interest that may be read. Thereby, whatever the position of the first row of the area of interest, the reading of the area of interest allows the reading of more than SIZE_G successive pairs of test pixels of the third array M3. Processor 16 is configured to determine at least one first pattern P1 among the read pairs of pixels and to reconstruct at least one complete second pattern P2 from which the position of the area of interest may be determined.

According to an embodiment, if an error is determined by processor 16 on assignment of the value "0" or "1" to the test signal, processor 16 determines that the row and/or the column to which the test pixel having delivered this test signal belongs is invalid. Further, if an error is determined by processor 16 during the verification of the fact that the values of the test pixels of each pair of test pixels should be opposite, processor 16 determines that the row and/or the column to which the pair of test pixels having delivered these test signals belongs is invalid. Advantageously, if a row and/or column is considered as invalid, processor 16 may, however, determine the orientation of the image and/or the position in array 12 at which it is located. According to an embodiment, if two rows or more, or two columns or more, of the image are considered as invalid, processor 16 may determine that it is not capable of guaranteeing that the orientation and the position of the image are correct and thus determine that the entire image has to be considered as corrupt.

According to an embodiment, if processor 16 determines based on the first pattern P1 that the orientation of the image is incorrect and/or based on the second pattern that the position in the image is not that expected, processor 16 may determine that the entire image has to be considered as corrupt.

The method carries on at step 53A.

At step 53A, processor 16 determines, after the verifications performed at step 52A, whether alert conditions are fulfilled and transmits an alert message when the alert conditions are fulfilled. According to an embodiment, an alert message may be transmitted by processor 16 if it is detected that the image is not properly oriented, for example, if a right-left and/or top-bottom inversion is detected. According to an embodiment, an alert message may be transmitted whether it is detected that the readout and analog-to-digital conversion circuit 14 does not correctly operate for a column. According to an embodiment, an alert message may be transmitted if it is detected that the position of the read area of interest is not correct. The method carries on at step 54. According to an embodiment, an alert message may be transmitted by processor 16 if it is detected that a row control signal is not correct, particularly when a test pixel of array M3 is invalid.

At step 54, the next row of array 12 to be selected is determined. The method returns to step 50.

At step 52B, the processor carries out a processing on the video signals. The processing may be carried out after the complete acquisition of the image or of the area of interest and/or along the acquisition of the successive rows of the image or of the area of interest. The processing may particularly depend on the application having the image sensor used therein. According to an embodiment, processor 16 may perform processing operations aiming at improving the quality of the image, for example, the sharpness of the image.

The method carries on at step 53B, processor 16 transmits signals to the outside of the image sensor. As an example, processor 16 transmits the video signals after the processing operations for improving the quality of the images.

The method carries on at step 54.

Advantageously, step 52A may be directly implemented by the processor 16 of image sensor 10. This enables to accelerate the image processing.

As a variant, steps 52A and 53A may be implemented by another processor than processor 16 based on the test signals delivered by processor 16.

Figure 6:
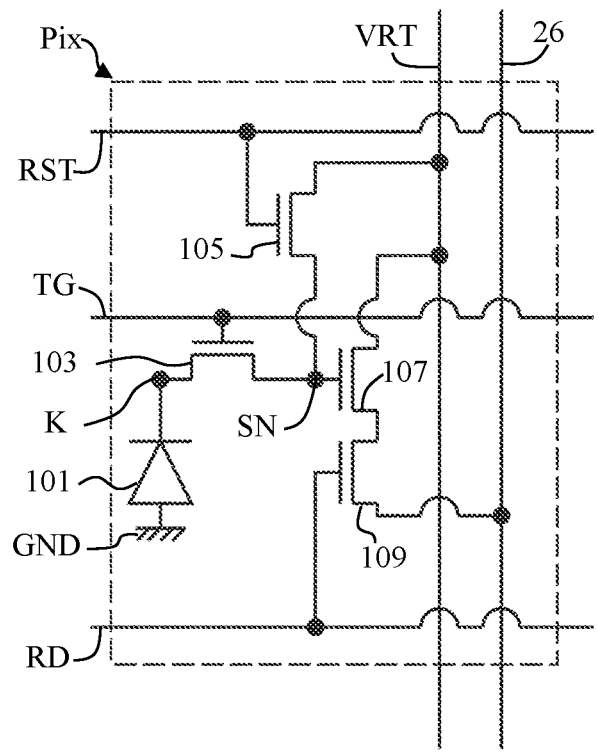
FIG. 6 shows an example of embodiment of an image pixel of the image sensor of FIGS. 2.

FIG. 6 shows an embodiment of an image pixel Pix.

Each image pixel Pix comprises a photodiode 101, a storage node K formed by the cathode of the photodiode, a capacitive sense node SN, a MOS transistor 103 or transfer transistor coupling storage node K to sense node SN, a MOS transistor 105 or reset transistor coupling sense node SN to a node of application of a high reset voltage VRT, and a read circuit coupling sense node SN to an output track 26. In this example, in each pixel Pix, the readout circuit of the pixel comprises a MOS transistor 107 or amplification transistor, assembled as a source follower, having its gate connected to the sense node SN of the pixel, and a MOS transistor 109 or selection transistor, coupling the source of transistor 107 to the output track 26 of the pixel. In the shown example, transistors 103, 105, 107, and 109 are N-channel transistors, and the drain of transistor 107 is coupled to a node of application of potential VRT. Further, in this example, the anode of photodiode 101 is coupled to a node of application of a low reference voltage GND, lower than voltage VRT, for example, the ground.

Further, in the example of FIG. 6, each row $R_i$ of pixels Pix is associated with: a node of application of a signal TG for controlling the transfer transistors 103 of the pixels in the row; a node of application of a signal RST for controlling the reset transistors 105 of the pixels in the row; and a node of application of a signal RD for controlling the selection transistors 109 of the pixels in the row. The nodes RD, the nodes TG, and the nodes RST of the pixels Pix of row $R_i$ are coupled to selection tracks 24, not shown, of row $R_i$.

Figure 7:
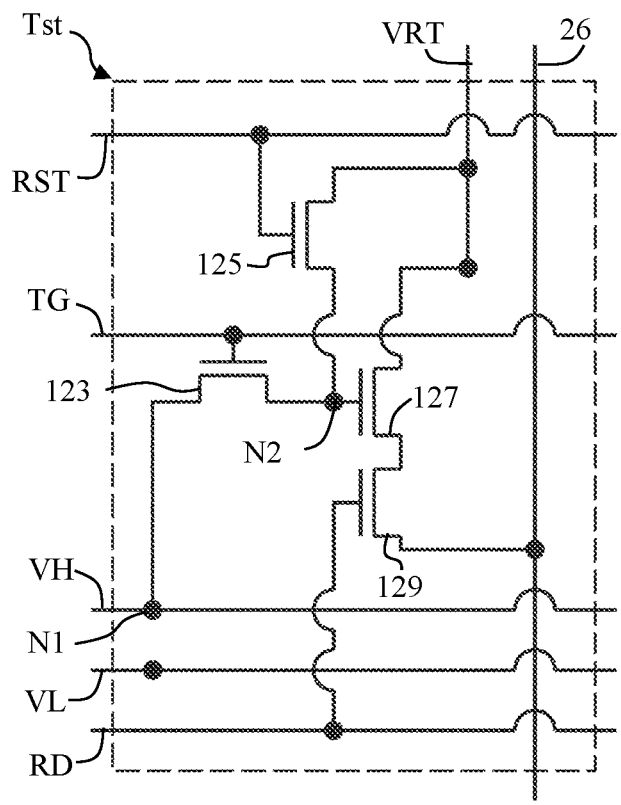
FIG. 7 shows an embodiment of a test pixel of the image sensor of FIG. 2.

FIG. 7 shows an embodiment of a test pixel Tst. Each test pixel Tst comprises a MOS transistor 123 or transfer transistor, coupling a node N1 of the test pixel to a sense node N2, a MOS transistor 125 or reset transistor, coupling the sense node N2 of the test pixel to a node of application of a reset potential, potential VRT in this example, and a readout circuit coupling sense node N2 to the output track 26 associated with test pixel Tst. Node N1 is coupled, preferably connected, to one of a track VH for supplying a high potential or a track VL for supplying a low potential. In the example of FIG. 7, node N1 is shown connected to high potential supply track VH. For the test pixels Tst of second array M2, tracks VH and VL extend along the rows $RT_k$ of second array M2. For the test pixels Tst of third array M3, tracks VH and VL extend along the columns $CT_p$ of third array M3.

In the example shown in FIG. 7, each test pixel Tst is connected, via its readout circuit, to one and only one output track 26 of the sensor, and the different test pixels Tst are connected, via their readout circuits, to distinct output tracks 26. In this example, in each test pixel Tst, the readout circuit of the test pixel comprises a MOS transistor 127 or amplification transistor, assembled as a follower source, having its gate connected to the sense node N2 of the pixel, and a MOS transistor 129 or selection transistor, coupling the source of transistor 127 to the output track 26 associated with test pixel Tst. In the shown example, transistors 123, 125, 127, and 129 are N-channel transistors, and the drain of transistor 127 is coupled to a node of application of voltage VRT. In this example, each test pixel Tst differs from an image pixel Pix of the sensor only in that, in the test pixel, photodiode 101 is not present. In this example, the anode and cathode nodes of photodiode 101 are confounded in node N1.

According to an embodiment, when value "1" is to be "stored" into test pixel Tst, the node N1 of test pixel Tst is coupled, preferably connected, to low potential supply track VL and when value "0" is to be "stored" into test pixel Tst, the node N1 of test pixel Tst is coupled, preferably connected, to high potential supply track VH. This advantageously enables to be coherent with the photodiode image pixel Pix, for which the light capture generates an inverse conduction of the photodiode and decreases the potential at storage node K.

Various embodiments and variants have been described. Those skilled in the art will understand that certain features of these various embodiments and variants may be combined, and other variants will occur to those skilled in the art. In particular, in the previously described embodiments, the value "0" or "1" stored in each test pixel Tst is constant. As a variant, each test pixel Tst may be coupled to track VH by a first controllable switch and be coupled to track VL by a second controllable switch, the second switch being off when the first switch is on and conversely. This enables to change the value stored in test pixel Tst. As an example, the value stored in at least certain test pixels Tst is inverted for each acquisition of a new image.

Finally, the practical implementation of the described embodiments and variations is within the abilities of those skilled in the art based on the functional indications given hereabove.

The invention claimed is:

1. An electronic device, comprising:
a first array of image pixels having inputs coupled to first selection tracks and outputs coupled to first output tracks;
at least one second array of test pixels having inputs coupled to second selection tracks and outputs coupled to the first output tracks;
at least one third array of test pixels having inputs coupled to the first selection tracks and outputs coupled to second output tracks; and
a processor coupled to receive output signals on the first and second output tracks;
wherein each test pixel of the second and third arrays is configured to generate the output signal at one of only two possible reference voltage values set by a circuit connection of the test pixel in the absence of a selection track defect or output track defect; and
wherein the processor is configured to identify existence of the selection track defect or output track defect in response to the output signal received from one or a plurality of the test pixels having a value other than said one of the two possible reference voltage values set by the circuit connection.

2. The electronic device according to claim 1, wherein each image pixel comprises at least one photodiode that is configured to generate an output voltage dependent on received light, and wherein each test pixel comprises an input coupled by said circuit connection to receive one or another of a first reference voltage and a second reference voltage, wherein the second reference voltage is different from the first reference voltage, said first reference voltage corresponding to one of the two possible reference voltage values and the second reference voltage corresponding to another of the two possible reference voltage values.

3. The electronic device according to claim 1, further comprising:
a row control circuit configured to control the first and second selection tracks; and
an analog processing and analog-to-digital conversion circuit coupled to the first and second output tracks;
wherein the row control circuit is located adjacent the first array and said at least one second array;
wherein the analog processing and analog-to-digital conversion circuit is located adjacent the first array and said at least one third array;
wherein the at least one second array is located adjacent the first array on a side opposite the analog processing and analog-to-digital conversion circuit; and
wherein the at least one third array is located adjacent the first array on a side opposite the row control circuit.

4. The electronic device according to claim 1, wherein the image pixels of the first array are configured to deliver video signals on acquisition of an image, wherein one or more of the at least one second array or the at least one third array comprises at least one assembly of test pixels configured to deliver output signals, and
wherein the processor is configured to: successively receive said output signals of the at least one assembly of test pixels along with video signals; determine from the voltage values for a portion comprising at least a given number of the output signals of the at least one assembly of test pixels whether an orientation of the image is correct; and determine which position of the first array of image pixels correspond the video signals read with the output signals.

5. The electronic device according to claim 4, wherein the given number of output signals corresponds to a length of a smallest region of interest of the image on which the processor is configured to apply a processing operation.

6. The electronic device according to claim 4, wherein the determination by the processor of whether the orientation of the acquired image is correct, and the determination by the processor of the position of the first array of image pixels correspond the video signals read with the output signals of said portion, is made even if the voltage value of one of the output signals of said portion is not at the one of said two voltage values set by the circuit connection of the test pixel.

7. The electronic device according to claim 4, wherein the processor is configured to determine, for each output signal, whether the output signal is at the one of said two voltage values set by the circuit connection of the test pixel and, in the case where the output signal is not at the one of said two voltage values set by the circuit connection of the test pixel, indicate that the image pixels, coupled to a same selection track and/or to a same first output track as that test pixel, are invalid.

8. The electronic device according to claim 4, wherein the test pixels of the at least one assembly of test pixels are distributed in successive groups of test pixels, each group comprising a first set of test pixels and a second set of test pixels, wherein the first set of test pixels of each group are configured to deliver same output signals, and wherein at least a portion of the test pixels of the second set of test pixels are configured to deliver the output signals at one of the two voltage values which are different from one group to another group.

9. The electronic device according to claim 8, wherein the test pixels of each first set are configured to deliver a succession of output signals alternating between the first and second voltage values.

10. The electronic device according to claim 8, wherein the test pixels of the second set of each group are configured to deliver output signals with voltage values coding a unique identifier of said group.

11. The electronic device according to claim 10, wherein the test pixels of each second set are distributed into pairs of test pixels configured to deliver the same voltage values.

12. The electronic device according to claim 4, wherein each assembly of test pixels comprises a first row or column of test pixels adjacent to a second row or column of test pixels, the pixels of the first and second rows or columns being paired, and the test pixels or each pair of test pixels being configured to deliver different output signals among the two voltage values.

13. The electronic device according to claim 12, wherein the processor is configured to determine, for each pair of test pixels, whether voltage values for the output signals delivered by the test pixels in the pair are different and, in the case where the voltage values for the output signals are not different, indicate that the image pixels, coupled to a same selection track and/or to a same first output track as the test pixels in the pair, are invalid.

14. The electronic device according to claim 4, wherein the image pixels of the first array are arranged in rows and in columns, the electronic device configured to operate in a first configuration where all rows of the first array are successively selected and in a second configuration where only a portion of the rows of the first array are successively selected, and wherein a number of test pixels of said at least one assembly of test pixels is smaller than a number of rows of said portion.

15. An electronic device, comprising:
a first array of image pixels having inputs coupled to first selection tracks and outputs coupled to first output tracks;
at least one second array of test pixels having inputs coupled to second selection tracks and outputs coupled to the first output tracks;
at least one third array of test pixels having inputs coupled to the first selection tracks and outputs coupled to second output tracks; and
a processor coupled to receive output signals on the first and second output tracks;
wherein each test pixel of the second and third arrays is configured to generate the output signal at one of only two possible values set by a circuit connection of the test pixel in the absence of a selection track defect or output track defect; and
wherein the processor is configured to identify existence of the selection track defect or output track defect in response to the output signal received from one or a plurality of the test pixels having a value other than said one of the two possible values set by the circuit connection;
wherein each test pixel comprises a first MOS transistor having a drain coupled to an input node, a source coupled to a second node, and a gate coupled to one of the selection tracks, a second MOS transistor having a drain coupled to a high reference voltage, a source coupled to the second node, and a gate coupled to a reset signal track, a first follower coupled to the second node and configured to replicate a voltage on the second node towards an output of the first follower, and a third transistor having a drain coupled to the output of the second follower, a source coupled to a read output, and a gate coupled to a readout signal track; and wherein each image pixel comprises a photodiode, a fourth MOS transistor having a drain coupled to the anode or the cathode of the photodiode, a source coupled to a third node, and a gate coupled to one of the selection tracks, a fifth MOS transistor having a drain coupled to the high reference voltage, a source coupled to the third node, and a gate coupled to a reset signal track, a second follower coupled to the third node and configured to replicate a voltage on the third node towards an output of the second follower, and a sixth transistor having a drain coupled to the output of the second follower, a source coupled to a read output, and a gate coupled to a readout signal track.

16. The electronic device according to claim 15, wherein said circuit connection connects the input node at the drain of the first MOS transistor to either a first reference voltage node to set a first one of the two possible values or a second reference voltage node to set a second one of the two possible values.

17. An electronic device, comprising:
an array of image pixels having inputs coupled to first selection tracks and outputs coupled to first output tracks;
an array of test pixels having inputs coupled to second selection tracks and outputs coupled to the first output tracks; and
a processor coupled to receive output signals on the first output tracks;
wherein each test pixel of the array of test pixels is configured to generate the output signal at one of only two possible light intensity values set by a circuit connection of the test pixel in the absence of a selection track defect or output track defect; and
wherein the processor is configured to identify existence of the selection track defect or output track defect in response to the output signal received from one or a plurality of the test pixels having a value other than said one of the two possible light intensity values set by the circuit connection.

18. The electronic device according to claim 17, wherein each image pixel comprises at least one photodiode that is configured to generate an output voltage dependent on received light, and wherein each test pixel comprises an input coupled by said circuit connection to receive one or another of a first reference voltage and a second reference voltage, said first reference voltage corresponding to one of the two possible light intensity values and the second reference voltage corresponding to another of the two possible light intensity values.

19. An electronic device, comprising:
an array of image pixels having inputs coupled to first selection tracks and outputs coupled to first output tracks;
an array of test pixels having inputs coupled to second selection tracks and outputs coupled to the first output tracks; and
a processor coupled to receive output signals on the first output tracks;
wherein each test pixel of the array of test pixels is configured to generate the output signal at one of only two possible values set by a circuit connection of the test pixel in the absence of a selection track defect or output track defect and wherein the processor is configured to identify existence of the selection track defect or output track defect in response to the output signal received from one or a plurality of the test pixels having a value other than said one of the two possible values set by the circuit connection;

wherein each test pixel comprises a first MOS transistor having a drain coupled to an input node, a source coupled to a second node, and a gate coupled to one of the selection tracks, a second MOS transistor having a drain coupled to a high reference voltage, a source coupled to the second node, and a gate coupled to a reset signal track, a first follower coupled to the second node and configured to replicate a voltage on the second node towards an output of the first follower, and a third transistor having a drain coupled to the output of the second follower, a source coupled to a read output, and a gate coupled to a readout signal track; and wherein each image pixel comprises a photodiode, a fourth MOS transistor having a drain coupled to the anode or the cathode of the photodiode, a source coupled to a third node, and a gate coupled to one of the selection tracks, a fifth MOS transistor having a drain coupled to the high reference voltage, a source coupled to the third node, and a gate coupled to a reset signal track, a second follower coupled to the third node and configured to replicate a voltage on the third node towards an output of the second follower, and a sixth transistor having a drain coupled to the output of the second follower, a source coupled to a read output, and a gate coupled to a readout signal track.

20. The electronic device according to claim 19, wherein said circuit connection connects the input node at the drain of the first MOS transistor to either a first reference voltage node to set a first one of the two possible values or a second reference voltage node to set a second one of the two possible values.

21. An electronic device, comprising:
an array of image pixels having inputs coupled to first selection tracks and outputs coupled to first output tracks;
an array of test pixels having inputs coupled to the first selection tracks and outputs coupled to second output tracks; and
a processor coupled to receive output signals on the first and second output tracks;
wherein each test pixel of the array of test pixels is configured to generate the output signal at one of only two possible logic values set by a circuit connection of the test pixel in the absence of a selection track defect or output track defect; and
wherein the processor is configured to identify existence of the selection track defect or output track defect in response to the output signal received from one or a plurality of the test pixels having a value other than said one of the two possible logic values set by the circuit connection.

22. The electronic device according to claim 21, wherein each image pixel comprises at least one photodiode that is configured to generate an output voltage dependent on received light, and wherein each test pixel comprises an input coupled by said circuit connection to receive one or another of a first reference voltage and a second reference voltage, said first reference voltage corresponding to one of the two possible logic values and the second reference voltage corresponding to another of the two possible logic values.

23. An electronic device, comprising:
- an array of image pixels having inputs coupled to first selection tracks and outputs coupled to first output tracks;
- an array of test pixels having inputs coupled to the first selection tracks and outputs coupled to second output tracks; and
- a processor coupled to receive output signals on the first and second output tracks;
- wherein each test pixel of the array of test pixels is configured to generate the output signal at one of only two possible values set by a circuit connection of the test pixel in the absence of a selection track defect or output track defect and wherein the processor is configured to identify existence of the selection track defect or output track defect in response to the output signal received from one or a plurality of the test pixels having a value other than said one of the two possible values set by the circuit connection;
- wherein each test pixel comprises a first MOS transistor having a drain coupled to an input node, a source coupled to a second node, and a gate coupled to one of the selection tracks, a second MOS transistor having a drain coupled to a high reference voltage, a source coupled to the second node, and a gate coupled to a reset signal track, a first follower coupled to the second node and configured to replicate a voltage on the second node towards an output of the first follower, and a third transistor having a drain coupled to the output of the second follower, a source coupled to a read output, and a gate coupled to a readout signal track; and
- wherein each image pixel comprises a photodiode, a fourth MOS transistor having a drain coupled to the anode or the cathode of the photodiode, a source coupled to a third node, and a gate coupled to one of the selection tracks, a fifth MOS transistor having a drain coupled to the high reference voltage, a source coupled to the third node, and a gate coupled to a reset signal track, a second follower coupled to the third node and configured to replicate a voltage on the third node towards an output of the second follower, and a sixth transistor having a drain coupled to the output of the second follower, a source coupled to a read output, and a gate coupled to a readout signal track.

24. The electronic device according to claim 23, wherein said circuit connection connects the input node at the drain of the first MOS transistor to either a first reference voltage node to set a first one of the two possible values or a second reference voltage node to set a second one of the two possible values.

* * * * *